Figure 1:
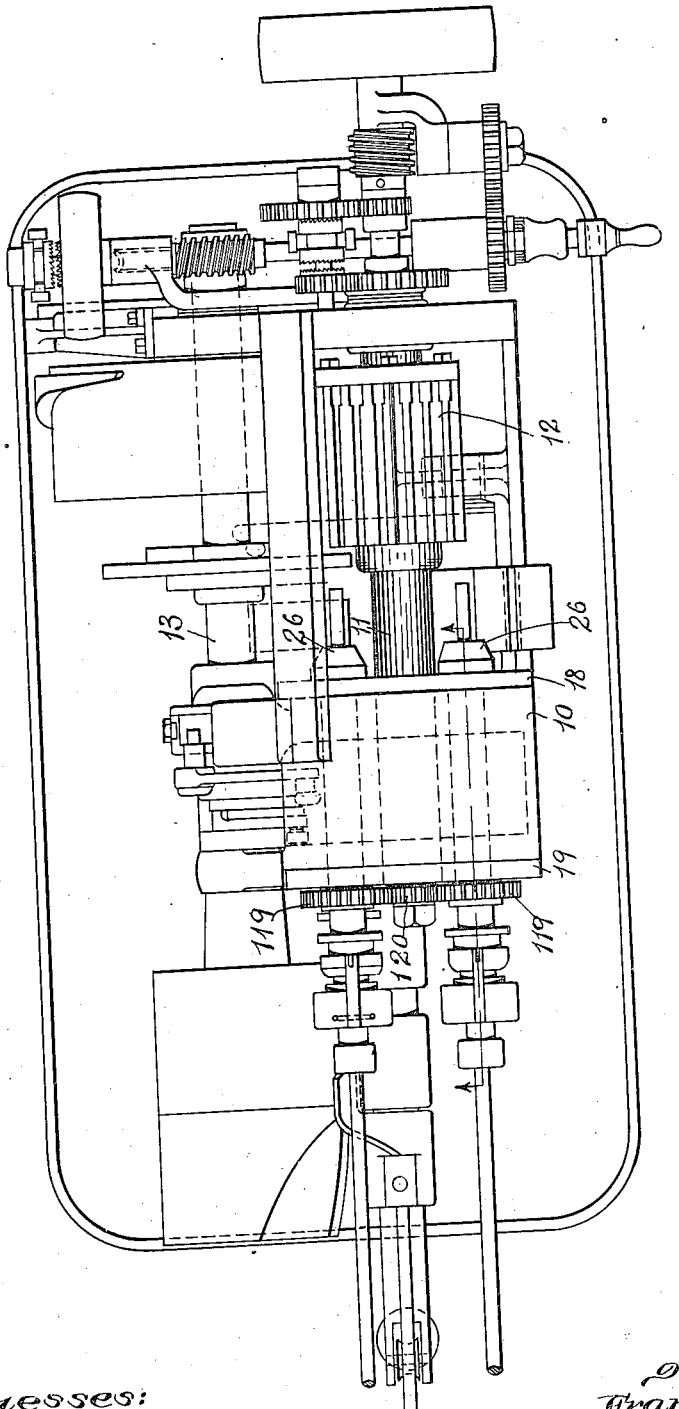

F. L. CONE.
SPINDLE BEARING FOR MULTIPLE SPINDLE METAL WORKING MACHINES.
APPLICATION FILED FEB. 8, 1915.

1,168,249.

Patented Jan. 11, 1916.
2 SHEETS—SHEET 1.

Witnesses:
A. L. Folsom
H. A. Rahn

Inventor:
Frank L. Cone
by Wright Brown Quinby May
Attorneys

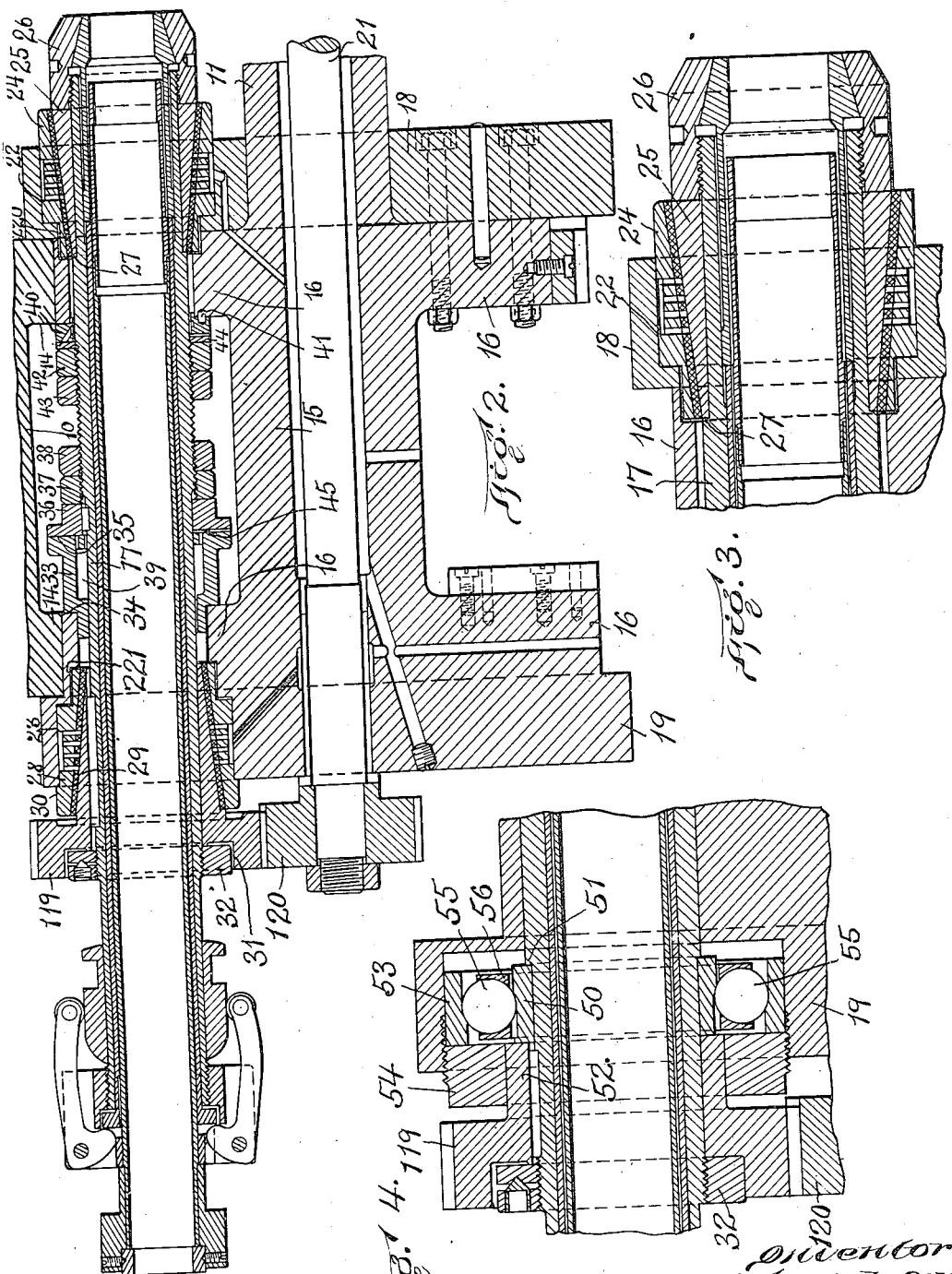

UNITED STATES PATENT OFFICE.

FRANK L. CONE, OF WINDSOR, VERMONT, ASSIGNOR TO WINDSOR MACHINE COMPANY, OF WINDSOR, VERMONT, A CORPORATION OF VERMONT.

SPINDLE-BEARING FOR MULTIPLE-SPINDLE METAL-WORKING MACHINES.

1,168,249.  Specification of Letters Patent.  Patented Jan. 11, 1916.

Application filed February 8, 1915. Serial No. 6,877.

*To all whom it may concern:*

Be it known that I, FRANK L. CONE, a citizen of the United States, and resident of Windsor, in the county of Windsor and State of Vermont, have invented certain new and useful Improvements in Spindle-Bearings for Multiple-Spindle Metal-Working Machines, (Case A,) of which the following is a specification.

This invention has relation to metal-working machines of the multi-spindle type, in which the work-carrying spindles are journaled in a rotatable turret which is rotated with a step-by-step movement so as to bring the pieces of work successively to the several tools which are to operate thereon. In such machines it is necessary to rotate the spindles at various speeds according to the character of the cut to be made, and it is of the greatest importance that they should be so mounted and supported as to hold the work rigidly against yielding under the various strains to which it is subjected during the cutting operation. These strains are either lateral, as in the operation of forming or cutting off, or longitudinal or endwise of the spindle, as in the case of drilling; and at times the strains are both longitudinal and lateral as in the case of turning, or when two operations are being performed, such as forming and drilling. These diverse strains and thrusts upon the spindles must be resisted by the bearings in the turret in which the spindles are mounted, and when the spindles are journaled in the ordinary friction bearings the latter soon become worn and allow the work to yield and thus prevent a perfect operation. Where a single bearing is called upon to resist not only a longitudinal thrust but also a lateral thrust, the friction increases because of the cumulative action due to the expansion of the bearing by the heat. This heat, furthermore, is conducted to the spindle and causes a perceptible expansion and displacement of the work with reference to the cutter. Machines of this general character, even when constructed for operating upon relatively small work, say 1¼″ in diameter, are necessarily large, heavy and cumbersome. It is important that the bearings should be large in diameter so as to resist the lateral strains; but to make them larger than is required for resisting the lateral thrust materially increases the weight and the cost of manufacture of the machines and consequently increases the cost to the ultimate user.

The object of the present invention is to provide a machine of this character with improved bearings for the spindle so that the bearing which is called upon to resist the end thrust is widely separated from that employed for resisting lateral thrust, in consequence of which the load is distributed to widely separated or remote bearings, thereby decreasing the friction on either end, and the generation of heat which would act still further to increase the friction by expanding the engaging parts.

It is highly undesirable to increase the diameter of the turret or the diameter or thickness of the turret bearing, because of the increased weight of the machine, and yet, as explained, it is most desirable that the spindle bearings should be large in diameter. In accordance with the present invention, the work spindles are journaled in bearings which are located outside of the transverse vertical planes of the turret bearing, as a result of which the bearings may be greatly increased in diameter. Furthermore, the bearings are so arranged and related to the spindle that the bearings which resist the rear end thrust are not called upon to withstand the lateral thrust of the spindle, whereas the bearings which resist the lateral thrust are not called upon to resist end thrust in either direction. By arranging the bearings outside of the transverse vertical planes of the turret bearing, I am able to support the spindle at more widely separated points than would otherwise be possible, thus increasing the stability of control.

On the accompanying drawings I have illustrated a multiple-spindle metal-working machine in which the invention is embodied but to which, however, the invention is not limited.

Referring to the said drawings: Figure 1 represents a plan view of the machine referred to. Fig. 2 represents a longitudinal section through the turret. Fig. 3 represents an enlarged section through the front end of one of the spindles and illustrates the taper bearing. Fig. 4 illustrates another form of bearing which may be utilized for the rear end of the spindle in lieu of a taper bearing.

It is unnecessary to describe in detail the general features of the machine which is illustrated upon the drawings, as it does not differ materially from that illustrated in the patent to George Otis Gridley, No. 904,866, dated November 24, 1908. It may suffice to state that the machine is provided with a turret bearing 10 in which the turret is journaled, said turret being formed with an extension 11 on which is mounted the slidable tool holder 12. By suitable means the turret is indexed to feed the work step by step to the tools on the tool slide. The tool slide is fed by mechanism actuated by a feed or drum shaft 13. These parts are all described in detail in the said patent.

The turret bearing 10 is provided with two internal flanges 14, 14 which are separated as shown in Fig. 2, and in which is mounted the turret which is indicated at 15 and which is provided with the extension 11 previously referred to. The turret is formed or provided with separated peripheral flanges 16, 16 which are mounted in the internal flanges or bearings 14 of the main turret bearing 10. The turret flanges 16 are apertured to receive the spindles which are indicated at 17. It will be unnecessary to describe all the features of construction of the spindle, it sufficing to state that each is provided with a suitable stock-feeding mechanism. On one end face of the turret there is secured removably by bolts or other suitable fastenings a disk 18 which is apertured so as to fit snugly upon the turret extension 11. This disk is of greater diameter than the turret flanges 16, and it overlaps the end of the turret bearing. At the opposite end of the turret there is a similar disk 19 which, however, is shown as formed integrally with the turret, and which likewise overlaps the other end of the turret bearing. This disk may be made separately and secured in place in the same way as the disk 18 is formed and secured. It is desirable that one of these disks should be formed separately and made removable in order to permit the turret to be inserted into or withdrawn endwise from its bearing in the main frame of the machine.

Keyed upon the rear end of each spindle there is a gear 119 to which power is applied from a centrally located gear 120 mounted on a shaft 21 for the purpose of imparting rotation thereto. In Fig. 2 I have illustrated the spindle as being mounted in taper bearings, which I find advantageous to use because of their capacity for adjustment to compensate for wear. The two disks 18 and 19 are apertured to receive loosely the spindle, as indicated at 220 and 221, and they are also formed with cups 22, 23 to receive the taper bearings. I will describe first the taper bearing for the front end of the spindle. This consists of two sleeves, 24, 25,—the outer stationary sleeve 24 having an internal taper and the sleeve 25, which may be of hardened steel, being tapered externally and ground, if desired, to fit therein. The end of the sleeve 24 abuts against the bottom of the cup or socket 22 and is held against rotation. The outer end of the sleeve 25 is engaged by the spindle nose 26 which is screwed upon the end of the spindle, and the inner end of the sleeve 25 abuts against a shoulder 26 formed on the spindle, so that said sleeve rotates with the spindle relatively to the outer sleeve 24. At the opposite end of the spindle I utilize like taper bearings comprising an outer sleeve 28 and an inner sleeve 29. The outer sleeve has an internal taper and is also shouldered at 30 to bear against the end face of the disk 19. The externally tapered sleeve 29, which is keyed upon the spindle, is shown as formed on the gear 119. The gear 119 is socketed, as at 31, to receive a collar 32 which is threaded upon the spindle. The two taper bearings are oppositely arranged, as shown, so that by adjusting the collar 32 the tapered sleeves 24 and 25, and 26 and 27, will be respectively adjusted, simultaneously, to compensate for wear. It will be noted from the drawings that these bearings extend diametrically or radially outwardly from the center of the turret beyond the bearing faces of the flanges 14 of the turret bearing, this being permitted by the fact that they may be located in transverse vertical planes beyond the end of the turret bearing. These two taper bearings are called upon to resist only lateral thrust of the spindle, separate bearings being utilized to resist end thrust. To resist the rearward end thrust I place upon the spindle a sleeve 33 which has a shoulder 34 abutting against the inner face of the turret flange 16. This sleeve has a relatively large end face 35 against which is the confronting face of the collar 36 which is splined upon the spindle. An adjusting nut 37 screwed upon the spindle engages the collar 36 and is held in place by a locknut 38. The sleeve 33 is provided with an internal socket 39 to receive oil; but as the feature of oiling comprises no part of the present invention, I will not describe how the oil is fed thereto. For the purpose of holding the spindle against forward thrust I employ a collar 40 which bears against the inner face of the turret flange 16 at the front end of the turret and which is pinned thereto as at 41 so as to hold it against rotation. Screwed upon the spindle are the adjusting nut 42 and the locking nut 43 therefor, and between the nut 42 and the collar 40 there is shown a washer 44. By these two end-thrust bearings which I have thus described, the spindle may be held against endwise movement. In view of the fact that the major end thrusts are toward the rear of the spindle, the collar 36 and sleeve 35 are provided with the relatively large confronting faces to which oil is supplied from the cavity 39 through the groove 45 in the face of the sleeve 33.

I have shown in Fig. 4 a lateral thrust bearing for the spindle which is of the antifriction type. This comprises the inner race 50 which is held against the shoulder 51 on the spindle by the hub 52 of the gear 119. The outer race 53 is located in the cup or socket in the disk 19 and may be adjusted relatively thereto by a collar 54 screwed into the cup as shown. The balls are indicated at 55, and they are separated by the usual cage or separator 56. The two races, 50, 53, are complemental and may be so formed that in addition to resisting lateral thrust they will also resist the rear end thrust. I do not herein, however, specifically claim a construction utilizing ball bearings, as that is set forth and claimed in my copending application, Serial No. 6,878, filed concurrently herewith.

It has been common practice in lathes and screw machines to make the spindle with a peripheral flange on the end next the spindle nose, which necessitated constructing the spindle of a forging. In the present case, the spindle may be made of a straight tubular bar which can be obtained in quantities commercially, and which can be turned to the form shown, in consequence of which I am able to make a material saving in the cost of construction. The durability of the spindle is increased by employing hardened steel sleeves or bushings as at 25 and 29, which may be ground on their bearing surfaces. Between the bearing surfaces of the coöperating sleeves 24 and 25, and 29 and 30 may be placed tapering bushings of bearing metal as shown. Ordinarily, were the spindle mounted in bearings such as described, the rearward strains on the spindle would cause it to increase the friction and to stick, but this is overcome in the present case by utilizing the end thrust bearing located between the taper bearings and held against movement by the rear peripheral flange of the turret. Hence it is possible to operate the spindle under forced conditions, and, should it become overheated to such an extent as to heat the end thrust bearing, the front and rear taper bearings would not be affected, since they are remote from the end thrust bearing. If the heat engendered by the friction of the end thrust bearing were sufficient to expand the spindle lengthwise, the taper bearings would be loosened (instead of being tightened) and the spinde would continue to rotate freely. Thus I am able to provide for a successful operation of the spindle under all conditions.

Having thus explained the nature of my said invention and described a way of constructing and using the same, although without attempting to set forth all the forms in which it may be made or all the modes of its use, what I claim is:

1. In a multi-spindle machine, a frame having a turret bearing, a turret journaled in said bearing, spindles passing through said turret in parallelism with the axis thereof, and bearings for said spindles supported by said turret and located beyond the ends of the turret bearing, whereby said spindle bearings may be of relatively large diameter.

2. In a multi-spindle machine, a frame having a turret bearing, a turret journaled in said bearing, spindles passing through said turret in parallelism with the axis thereof, end extensions formed on or secured to said turret, projecting beyond the turret bearing and of greater diameter than the turret, and spindle bearings mounted in said extensions in parallelism with the axis of the turret.

3. In a multi-spindle machine, a frame having a turret bearing, a turret journaled in said bearing, spindles passing through said turret in parallelism with the axis thereof, end extensions or disks formed on or secured to said turret and being located beyond the turret bearing and of greater diameter than the turret, said extensions or disks having cups or sockets formed in the outer faces thereof, and spindle bearings arranged in said cups or sockets.

4. In a multi-spindle machine, a frame having a turret bearing, a turret journaled in said bearing, spindles passing through said turret in parallelism with the axis thereof, end extensions on said turret beyond the turret bearing, and having apertured cups or sockets in the outer faces thereof, and taper bearings for the spindles located in said cups or sockets.

5. The combination with work spindles and a turret having sockets in the end faces thereof, of lateral thrust bearings for said spindles, comprising internally tapered sleeves in said sockets and abutting against sleeves in walls thereof, said sleeves flaring the end walls thereof, said sleeves flaring outwardly in opposite directions, and complemental externally and inwardly tapering sleeves, and end thrust bearings for said spindles bearing against said turret independently of the said sleeves.

6. The combination with a spindle and a main support having front and rear flanges, of lateral thrust bearings for said spindle, comprising internally and outwardly tapered sleeves mounted in said flanges, complemental internally but inwardly tapering sleeves secured to said spindle and rotatable in the first-mentioned sleeves, a rear end thrust bearing for the said spindle held against movement by the rear flange independently of said sleeves, 7. The combination of a spindle oppositely arranged externally tapered bearing sleeves at the opposite ends of said spindle and tapering toward each other, means on said spindle for holding said sleeves against outward endwise movement, complemental internally tapered bearing sleeves in which the first-mentioned sleeves are respectively journaled, separated supports for said internally tapered sleeves, and end thrust bearings located between said taper bearings independent thereof and remote therefrom for holding the spindle against endwise movement.

8. In a multi-spindle machine, the combination with a turret having remotely separated peripheral flanges at the ends thereof, of lateral thrust bearings supported by said flanges, spindles journaled in said bearings, and a rear end thrust bearing for each spindle located between said flanges and abutting against the rear peripheral flange of the turret independently of said lateral thrust bearings.

9. In a multi-spindle machine, the combination with a turret having remotely separated peripheral flanges at the ends thereof, of lateral thrust bearings supported by said flanges, spindles journaled in said bearings, a rear end thrust bearing for each spindle abutting against the rear peripheral flange of the turret, and a front end thrust bearing abutting against the front peripheral flange of said turret.

10. In a muti-spindle machine, the combination with a turret having at its ends remotely separated flanges or bearing supports, of a plurality of spindles, lateral thrust bearings for said spindles mounted in said flanges or supports, sleeves bearing against the inner face of the rear flange or support, collars splined on the several spindles and abutting against said sleeves, and means on said spindles for adjusting the collars thereon.

11. The combination with separated supports, of a spindle, a taper bearing for the front end of the spindle comprising an internally tapered sleeve bearing against one of said supports and a complemental sleeve or bushing tapered toward the rear end of the spindle and bearing against a shoulder on the spindle, and an end thrust bearing for the spindle held against axial movement by the other of said supports.

12. The combination of a straight spindle having a cylindrical periphery with a reduced front end forming a shoulder, an externally and rearwardly tapering bushing on the front end of the spindle having its ends abutting against said shoulder, an internally and forwardly tapering sleeve arranged to receive said externally tapered bushing, a support for said last-mentioned sleeve, means on said spindle for clamping the externally tapering bushing against said shoulder, and means independent of said bushings for holding said spindle against endwise movement under axial stresses.

13. The combination with a straight cylindrical spindle having a reduced front end which forms a shoulder, of complementally tapered sleeves, of which the inner sleeve is on said reduced end of the spindle and abuts against said shoulder, means for securing said last-mentioned sleeve to said spindle to rotate therewith, complementally tapered sleeves for the rear end of the spindle, the inner sleeve of which is adjustably splined on the spindle, said inner sleeves tapering toward each other, means for rigidly supporting the outer sleeves so that the inner sleeves may rotate therein with the spindle, and a collar in threaded engagement with the spindle and engaging the inner rear sleeve, and arranged by its adjustment to cause the axial adjustment of the spindle and inner sleeves relatively to the outer sleeves.

14. The combination with separated front and rear supports and lateral thrust bearings therein, of a spindle mounted in said bearings, of a rear end thrust bearing between said supports and abutting against said rear support for resisting rearward endwise thrusts of the spindle, a front end thrust bearing between said supports and abutting against the front support, and end thrust collars secured on said spindle, complemental to and engaging said end thrust bearings, whereby said spindle is held against endwise movement independently of the lateral thrust bearings.

In testimony whereof I have affixed my signature, in presence of two witnesses.

FRANK L. CONE.

Witnesses:
 Geo. O. Gridley,
 Isabell R. Gamash.